Jan. 26, 1965  P. A. OELGOETZ  3,167,493
MANUFACTURE OF HIGH-STRENGTH STEEL PARTS FOR USE
IN AIRCRAFT AND THE LIKE
Filed March 15, 1961  3 Sheets-Sheet 3
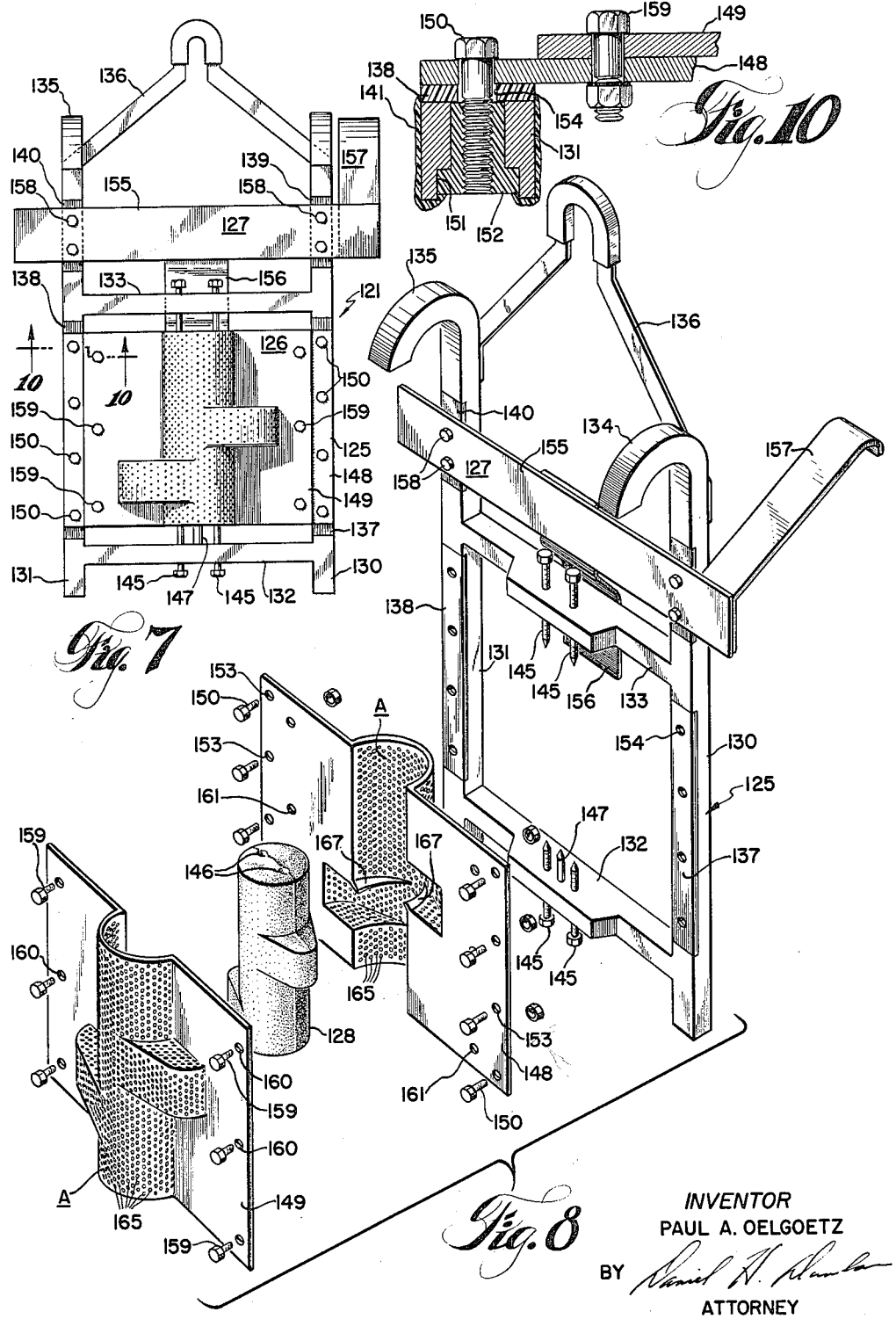
INVENTOR
PAUL A. OELGOETZ
BY
ATTORNEY

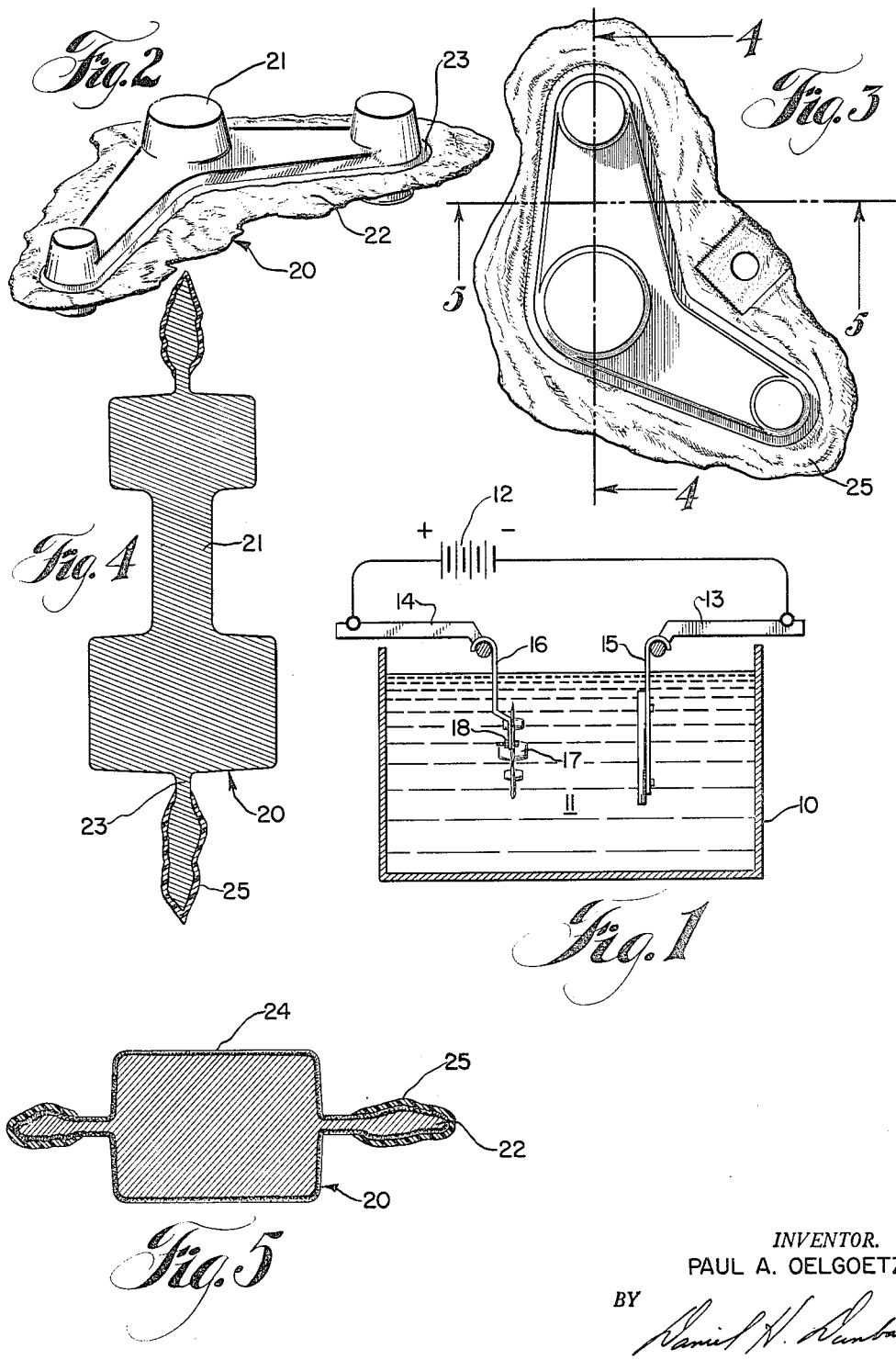

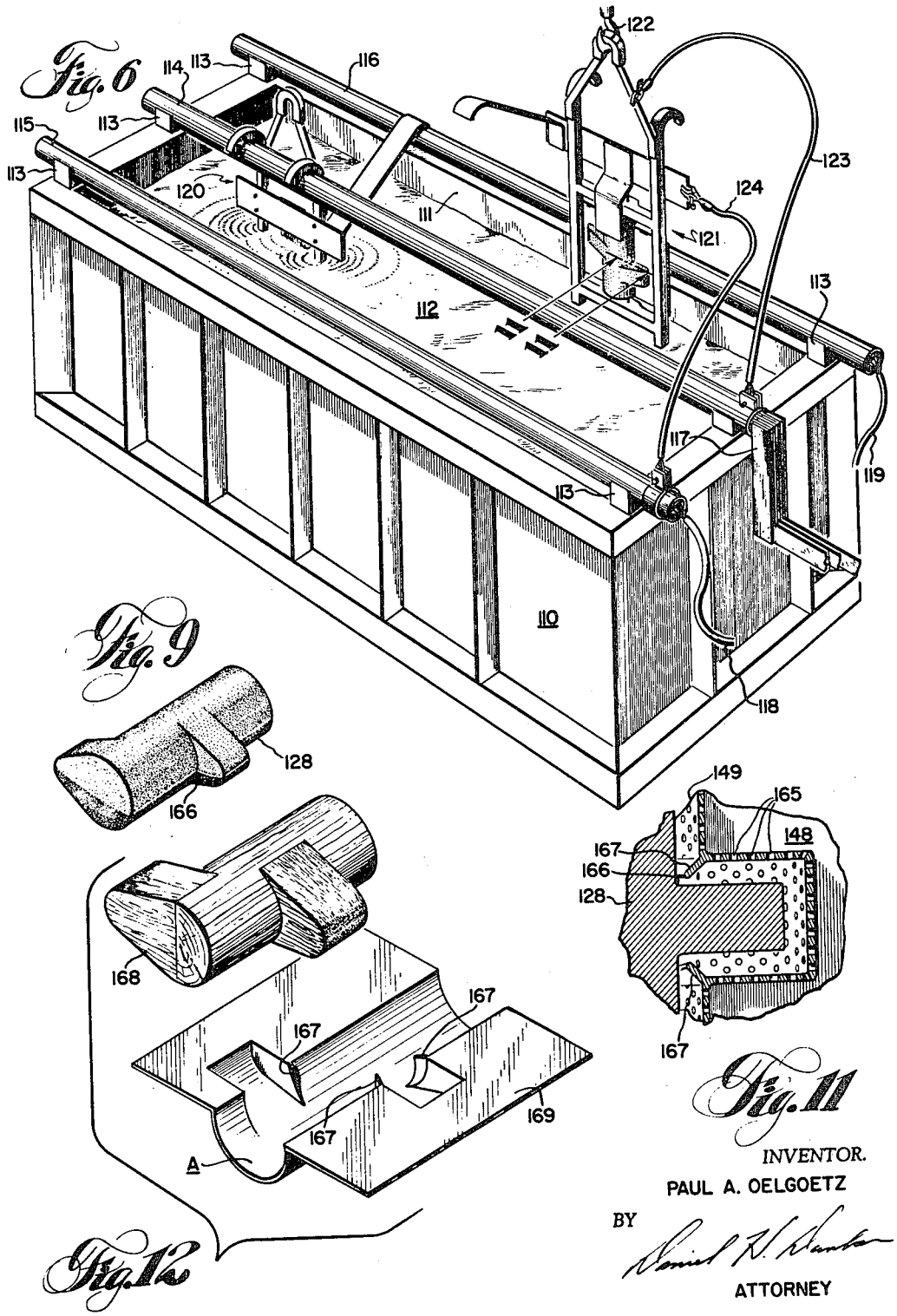

United States Patent Office 3,167,493
Patented Jan. 26, 1965

3,167,493
MANUFACTURE OF HIGH-STRENGTH STEEL
PARTS FOR USE IN AIRCRAFT AND THE
LIKE
Paul A. Oelgoetz, Columbus, Ohio, assignor to
North American Aviation, Inc.
Filed Mar. 15, 1961, Ser. No. 96,042
4 Claims. (Cl. 204—145)

This application is a continuation-in-part of my co-pending application for United States Patent Serial No. 733,291, filed May 6, 1958, now abandoned.

This invention pertains to the manufacture of high-strength steel parts such as are intended for use as structural components in aircraft and the like, and particularly relates to a method for processing parts made of heat-treatable or heat-treated alloy steel to develop improved fatigue properties therein in addition to a high-tensile strength.

Component parts which are intended for aircraft structural applications and which are fabricated of an alloy steel that is heat-treatable to a high-tensile strength often have a layer of metal which has been decarburized to a generally uniform depth throughout the surface regions of each part. Each such layer of decarburized metal exists in addition to and separate from any superimposed layer of scale, such as an oxide scale, and is especially common to heat-treatable alloy steel component parts made by a hot-forging process. Depending on part size and on degree of contouring required, such layers of decarburized metal frequently extend to a depth of approximately 0.030" beneath any scale present; greater depths of the decarburized metal layer are quite possible; depths of decarburized metal less than approximately 0.003" are sometimes tolerable.

The adverse effects associated with the presence of decarburized metal at the surface of a high-strength (heat-treatable) alloy steel part intended for an aircraft structural use are well-known. Lowered fatigue properties (strength and life) in the component part and restrictions to use of less than maximum allowable design stresses have been recognized. Each has a relation to an accompanying weight penalty. Other disadvantages, especially those associated with various methods of decarburized metal removal, have not always been completely appreciated or recognized. Use of known machine-tool, work-hardening, and acid-etching techniques for improving the physical or fatigue properties of a high-strength steel component part by removing or working decarburized surface metal will produce distinctly unacceptable results insofar as aircraft structural applications are concerned. Such unacceptable results relate generally to possible formation of stress risers, possible formation of residual stresses in surface material, and possible material embrittlement by reason of hydrogen absorption. In addition, the high cost associated with known machine-tool metal removal techniques cannot be overlooked, especially in the case of a highly contoured component part such as a forging.

The method of my invention overcomes the disadvantages heretofor associated with conventional techniques for improving the physical properties of a component part fabricated of high-strength alloy steel essentially with a method (and apparatus) which electrolytically removes decarburized metal uniformly from the surface of that high-strength steel part. Each part to be processed in accordance with my discovery is anodically immersed in a suitable electrolyte after scale material has been removed therefrom and conducts electrical energy a sufficient length of time to remove the decarburized metal from all surface areas of the part. Practice of the method of this invention produces a part surface which is free of conditions that might otherwise establish a stress riser or notch effect in the surface of the part. My invention also operates to provide a high-strength alloy steel component part which is free of work-hardened metal at the surface thereof, which does not include surface residual stresses, which permits the use of maximum allowable design stresses throughout the entire part, and which does not include absorbed hydrogen. The invention described and claimed in this application offers economic advantages over known machine-tool techniques that have been used for improving the physical and fatigue properties of high-strength alloy steel components by removal of decarburized metal. In addition, advantages are realized with respect to process time requirements, minimization of process hazards, and elimination of the necessity of special heat-treating environments in comparison to the practice of other methods of component part manufacture.

Other objects and advantages of this invention will become apparent during consideration of the drawings and description.

In the drawings:

FIG. 1 is a schematic illustration of apparatus used in the practice of this invention;

FIG. 2 is a perspective view of a high-strength alloy steel forging which is to be manufactured into a component part suitable for aircraft structural applications through practice of this invention;

FIG. 3 is a plan view of the forging of FIG. 2;

FIGS. 4 and 5 are sectional views taken along lines 4—4 and 5—5 of FIG. 3;

FIG. 6 illustrates, in perspective, a preferred embodiment of apparatus which may be used in practicing this invention;

FIG. 7 is an elevational view of a tooling assembly employed in the apparatus illustrated in FIG. 6;

FIG. 8 is an exploded illustration of the tooling assembly shown in FIG. 7;

FIG. 9 is a view of the component part shown in combination with the tooling assembly of FIG. 8;

FIGS. 10 and 11 are sectional views taken at lines 10—10 and 11—11 of FIGS. 7 and 6, respectively; and FIG. 12 illustrates intermediate tooling which may be used in connection with the fabrication of a portion of the tooling assembly illustrated in FIG. 8.

FIGS. 1 through 5 are provided to illustrate, in a general or schematic manner, component parts and apparatus relating to the practice of this invention. The schematic apparatus illustrated in FIG. 1 is comprised essentially of process tank 10, electrolyte solution 11, and the source of direct current electrical energy designated 12. Source 12 is indicated in FIG. 1 in the form of a battery having bus bars 13 and 14 electrically connected thereto. A source of rectified, alternating-current electrical energy may be used to comprise source 12. Bus bars 13 and 14 are respectively electrically connected to cathode means 15 and rack or frame means 16. The illustrated component part 17 is electrically connected to rack means 16 by fastener means 18, is typically fabricated of an alloy steel which is heat-treatable to a high-strength tensile level, is intended for use in an aircraft structural application, and is subjected to the process of this invention to remove decarburized metal from the surface regions thereof.

Decarburized metal removal is effected generally by the apparatus arrangement shown in FIG. 1 and involves an electrical current which flows from the negative terminal of source 12, through bus bar 13, through cathode means 15, through electrolyte solution 11, across the interface formed between electrolyte solution 11 and component part 17, then through component part 17, through the interior of fastener means 18, into rack means 16, through bus bar 14, and then to the positive terminal of electrical energy source 12. The above-detailed flow of electrical current is continued for a sufficient period of time to remove all decarburized metal from the component part.

It should be pointed out that in the equipment arrangement illustrated in FIG. 1 of the drawings, cathode means 15 is shown as being positioned with respect to the component part 17 so that electron flow through electrolyte solution 11 and into component part 17 is generally normal to the surfaces of the component part. Specific details with respect to a preferred embodiment of apparatus corresponding to components 10 through 18 and with respect to another form of component part 17 are later provided in connection with the description of FIGS. 6 through 12.

In FIG. 2, I illustrate a high-strength steel forging 20 which may be assembled to rack means 16 by fastener means 18 in the manner of component part 17. The forging 20 is comprised of a functional part 21, illustrated as a bellcrank having reinforcing bosses, a flash portion 22, and a channel-like area 23 defining the periphery of the functional part and connecting that part to the flash portion 22. Referring to FIG. 5, which is at a relatively greater scale than FIG. 4 to illustrate the presence of decarburized metal in the surface regions of forging 20, the depth of the surface layer 24 of decarburized metal below any oxide scale present on the part is frequently of the order of approximately 0.030". Hence, the electrical current flow previously described must be continued an appreciable length of time while the part is immersed in electrolyte solution 11 and until all decarburized metal is removed.

As shown in FIG. 3, 4, and 5, the flash portion 22 of forging 20 is coated on its surfaces with a protective strippable coating 25. The provision of a protective strippable coating 25 is optional and is economically justified only when the subsequently realized electrical energy cost savings exceed the costs associated with application of the coating. Also, in many instances the component part to be processed in accordance with this invention does not have any significant amount of flash to justify use of the strippable protective coating.

The preferred equipment arrangement illustrated in FIG. 6 includes a tank 110 having acid-resistant lining 111 and having an acid bath 112 contained therein. Lining 111 may be fabricated of a material such as polyvinyl chloride, natural rubber, synthetic rubber, or an organic composition such as polytetrafluoroethylene. Alternately, a tank 110 fabricated of wood in a leak-proof manner may be employed in lieu of lining 111. Supported by the edges of tank 110 and by the insulating blocks members 113 carried thereon are anode bus bar 114 and cathode bus bar 115. Bus bar 114 is electrically connected to the anode (positive) terminal of a direct current electrical energy source by the conductor means 117. Cable means 118 and 119 are provided to electrically connect cathode bus bars 115 and 116, respectively, to the cathode (negative) terminal of the same direct current electrical energy source.

The electrolyte solution 112 of FIG. 6 is preferably a water solution of a single acid. More specifically, a water solution containing from 20% to 30% (25%±5%) of sulfuric acid by weight is recommended. Although phosphoric acid-conducting solutions are preferred for use in electro-polishing operations, such are not best suited to the practice of this invention. In general, the conductivities of suitable phosphoric acid solutions are less than the conductivity of a 25%±5% sulfuric acid solution and therefore cause undesirable heating of the electrolyte solution. From a maintenance and control standpoint, single acid solutions are preferred rather than an electrolyte containing several acids in combination.

The equipment arrangement of FIG. 6 also includes tooling assemblies 120 and 121. Assembly 120 is partially immersed in bath 112 and its operating condition, and is supported by and electrically connected to bus bars 114 and 116. Tooling assembly 121 is illustrated suspended above bath 112 prior to partial immersion therein and is supported by the overhead hoist means 122. In the FIG. 6 illustration, assembly 121 is electrically connected to the aforesaid direct current electrical energy source through conductor means 117, bus bar 114, and temporary conductor 123, and through cable means 118, bus bar 115, and temporary conductor 124. Assembly 121 is shown in reversed relation to partially immersed assembly 120. For discussion purposes, further details are provided with respect to tooling assembly 121. Such details are equally pertinent to the tooling assembly designated 120.

Referring to FIGS. 7 and 8, tooling assembly 121 includes frame member 125, overlay means 126, and conductor means 127 which electrically connects overlay means 126 to cathode bus bar 115 when the assembly is positioned in bath 112. Assembly 121 contains the component part 128 (FIG. 8) which is to have decarburized metal uniformly removed from the surface thereof by the equipment described herein.

Frame member 125 is comprised of vertical bars 130 and 131 and transverse bars 132 and 133 connected thereto. The upper portion of each bar 130 and 131 is formed to provide the conductor portions 134 and 135 which electrically connect frame member 125 to anode bus bar 114 when the assembly is positioned in the electrolyte bath 112. Support 136 is connected to the upper portion of vertical bars 130 and 131 for use in raising and lowering assembly 121 into the bath. If desired, support 136 may be used as a temporary electrical conductor for connecting conductor 123 thereto as shown in FIG. 6. Insulating strips 137 and 138 are acid-resistant and are provided in recessed portions of bar members 130 and 131 to electrically insulate overlay means 126 therefrom when the tooling components are assembled. Likewise, insulating strips 139 and 140 are acid-resistant and are provided in recesses in the upper portion of vertical bars 130 and 131 to electrically insulate conductor means 127 therefrom when it is secured to the assembly for support. I prefer to fabricate frame member 125 and the metal components attached thereto of aluminum or an alloy thereof. Further, the exposed exterior portion of frame member 125 below conductor portions 134 and 135 is coated with an acid-resistant organic film 141. The presence of the frame coating is illustrated in the detail section of FIG. 10.

Contoured component part 128 is connected to frame member 125 by threaded fastener means 145 prior to the removal of surface metal from the part. Each fastener means 145 cooperates with a threaded opening provided in transverse bar 132 or transverse bar 133 and is arranged so that the illustrated pointed end portion thereof engages a corresponding opening 146 provided at an end of part 128. In an alternate arrangement, component part 28 can be provided with boss portions (not shown) for receiving openings 146 if the presence of such openings within the surface of the end product is objectionable. Such boss portions would be removed by a machine-tool or the like after surface metal has been removed from the part. Stud 147, which cooperates with a locating hole provided in part 128, is attached to transverse bar 132 for locating and supporting part 128 while it is being assembled to frame member 125. Fastener means 145 and stud 147 serve to electrically connect part 128 to anode bus bar 114 through frame member 125.

In order that part 128 might have excess metal uniformly removed therefrom, tooling assembly 121 is provided with the overlay means designated generally by the number 126. Overlay means 126 is comprised of fixed overlay 148 and removable overlay 149 electrically connected thereto. Details regarding the contoured portion A of each overlay and the relation of each contoured portion A to part 128 will be provided hereinafter.

Fastener means 150 connect fixed overlay 148 to frame member 125 in supporting relation only. Frame member 125 is provided with several counterbored openings such as 151 for receiving the shouldered and threaded insulating inserts 152 (see FIG. 10). Each fastener means 150 passes through an opening 153 provided in fixed overlay 148 through an opening 154 provided in either insulating strip 137 or insulating strip 138 and is threadably engaged with an insulating insert 152.

Overlay means 126 is electrically connected to a cathode bus bar through the previously-mentioned conductor means 127. Such conductor means is comprised of transverse bus strip 155, depending bus strip 145, and conductor member 157. Strip 156 is electrically connected to strip 155 and to fixed overlay means 148. Conductor member 157 is likewise electrically connected to transverse bus strip 15 and engages cathode bus bar 115 when assembly 121 is immersed in electrolyte 112. For purposes of rigidity, transverse bus strip 155 is secured to the upper portion of frame member 125 by the various fastener means 158. Each fastener means 158 may be secured to the upper portion of either vertical bar 130 or vertical bar 131 in the same manner as fastener means 150 is secured to the lower portion of frame member 125.

Overlay means 126 is completed by fastening removable overlay portion 149 to fixed overlay portion 148. Such is accomplished through fastener means 159 which pass through openings 160 in overlay 149 and through openings 161 in overlay 148. Details regarding this particular connection are illustrated in FIG. 10.

Referring to FIG. 8, overlays 148 and 149 are provided with a contoured portion A and with essentially flat portions extending to either side therefrom. Such flat portions contact each other when overlays 148 and 149 are combined to form overlay means 126. When component part 128 is properly installed in completed tool assembly 21, contoured portions A are arranged to be uniformly distant from the exterior surfaces of the part. In connection with the specific equipment installation described hereinafter, by way of example, it is preferred that the interior surfaces of contoured portions A be uniformly located approximately ¾" from the corresponding exterior surfaces of part 128.

Overlays 148 and 149 are fabricated of cast aluminum alloy and, by way of example, are preferably ¼" thick. Perforations 165 are provided in each contoured portion A and are preferably ¼" in diameter and spaced in staggered rows at approximately ⅝" on centers. Such perforations improve the uniformity of decarburized metal removal from the exterior surfaces of part 128. Such perforations are also conducive to improved circulation of etchant 112.

Component part 128 is illustrated as having fillet areas 166 (FIG. 9 and FIG. 11). In order that uniformity of decarburized metal removal might be extended to such areas, I prefer that overlay means 126 be provided with the projection elements designated 167. Such elements are electrically connected to overlay 148 and overlay 149 and, by way of example, project to within ¼" of the fillet root area. Elements 167, which are of an aluminum alloy or the like, may be secured to the overlay by a welding technique. For the best illustration of the installed projection elements 167, refer to overlay 148 of FIG. 8 and to FIG. 11.

By way of additional illustration, FIG. 12 shows a master pattern 168 which is made oversize with respect to component part 128. Pattern 168, which is ¾" oversize in the preferred arrangement, may be utilized in a conventional mold-making technique to produce a mold for casting the overlay intermediate 169. Intermediate 169 is provided with perforations 165 and projection elements 167 to create the completed overlay 148.

The method of this invention essentially relates only to alloy steels which are heat-treated or heat-treatable to high-tensile strengths of approximately 220,000 p.s.i. and above and which in their heat-treated condition are generally suited to aircraft structural applications. Such alloy steels are also referenced in this application as heat-treatable alloy steels having a carbon content of approximately 0.30% and above. Three compositions of a heat-treatable ultra-high-tensile strength alloy steel which may be processed in accordance with the teaching of my invention are given as follows on a percentage of total weight basis:

| Element | Steel "A" | Steel "B" | Steel "C" |
|---|---|---|---|
| Carbon | 0.33–0.38 | 0.48–0.53 | 0.38–0.43 |
| Manganese | 0.25–0.40 | 0.25–0.40 | 0.20–2.40 |
| Phosphorus | 0.025 max. | 0.025 max. | 0.025 max. |
| Sulphur | 0.025 max. | 0.025 max. | 0.025 max. |
| Silicon | 1.00–1.20 | 1.00–1.20 | 0.80–1.00 |
| Chromium | 4.75–5.25 | 4.75–5.25 | 4.75–5.25 |
| Molybdenum | 1.25–1.50 | 1.25–1.50 | 1.20–1.40 |
| Vanadium | 0.35–0.55 | 0.85–1.15 | 0.40–0.60 |
| Nickel | | 1.35–1.65 | |
| Iron | Remainder | Remainder | Remainder |
| Total | 100 | 100 | 100 |

The above-detailed alloy steels are essentially chromium, hot-work tool steels nominally carrying the AISI–SAE group designation of H11. Such materials are generally heat-treatable to tensile strengths in the range of from approximately 260,000 p.s.i. to approximately 300,000 p.s.i.

In addition, the method invention of this application relates to the processing of component parts manufactured from other carbon-containing heat-treatable steels such as the materials carrying AISI–SAE designations 4340, 98BV40, 4130, and the industry designation 300M. The hardness of such materials, after heat-treatment, generally extends from approximately Rockwell C 45 upwards.

Several additional details relating to the practice of my invention are provided as follows. I prefer that the electrical energy source 12 of FIG. 1 (or the equivalent energy source for the apparatus arrangement of FIGS. 6 through 12) be capable of providing a current density throughout the surface area of the workpiece 20 or 128 from which decarburized metal is to be removed that is in the range of from approximately 3 amperes per square inch to approximately 10 amperes per square inch. Such current density preferably is developed from a source voltage that is in the range of from approximately 5 volts D.C. to approximately 8 volts D.C. Generally speaking, current densities of less than approximately 3 amperes per square inch are impractical and result in an electro-polishing action as distinguished from the removal of decarburized metal to an adequate depth.

As previously suggested, electrolyte solution 11 (or 112) is preferably a water solution having a 25% ±5% sulfuric acid by weight even though other electrolytes may be used. In addition, I prefer that the electrolyte solution be maintained at a temperature of from approximately 30° C. to approximately 70° C. during practice of this invention. In some cases, cooling of the electrolyte solution will be required. It is also preferred that the electrolyte solution be sufficiently agitated, as by pressurized air, in order to prevent streaking of the component parts being processed by those gases which are liberated in the process tank during removal of decarburized metal. Also, it is preferred that suitable electrical connections be maintained between the energy source and the electrolyte and the component part at all times that any portion of the component is in the electrolyte solution. This is necessary to prevent the component parts from being subjected to hydrogen embrittlement through undesired absorption of hydrogen gas. In general, susceptibility of an alloy steel to hydrogen embrittlement may be correlated directly with tensile strength. Normally, hydrogen embrittlement is not a significant problem as to aircraft parts which have a tensile strength of less than 220,000 p.s.i. From experiences, I have learned that approximately one pound of decarburized metal can be removed from a hot-forged component part made of a heat-treatable alloy steel using less than approximately 20 kilowatt-hours of electrical energy. Also, it should be noted that the method of this invention provides each processed alloy steel part with a surface finish which is sufficiently smooth for aircraft structural component applications. Typical surface finishes which I have obtained range to as low as approximately 30 to 40 microinches root-mean-square (R.M.S.). In general, surface finishes of less than 125 microinches (R.M.S.) are necessary in the production of suitable aircraft structural components.

A spindle element for rotating and structurally supporting an all-movable vertical stabilizer relative to the fuselage portion of a high-performance, attack-type aircraft has been processed in accordance with the teachings of this invention. Such spindle part weighed approximately 125 pounds and was hot-forged from an alloy steel billet having the composition of previously-described Steel "C." The apparatus employed to remove approximately 0.030" of decarburized metal in the surface regions of the spindle part corresponded generally to the equipment arrangement disclosed in FIGS. 6 through 12 except as to the contour provided in cathode overlay components 148 and 149. In preparing the spindle component for processing in accordance with this invention, oxide scale was first completely removed from the part using conventional sand blasting techniques and apparatus. Thereafter, the part was located in a tooling assembly having the general details previously-described with respect to assembly 21 of FIGS. 6 and subsequent. Prior to immersing the spindle component and tooling assembly into the electrolyte solution, the tooling assembly was properly electrically connected to an operational source of D.C.-type electrical energy. The electrolyte solution was comprised of water and approximately 25% by weight of commercial sulfuric acid. The potential of the electrical energy source was maintained at approximately 5.0 volts D.C. and the power output developed by the energy source was sufficient to establish an electrical current density of approximately 3.4 amperes per square inch over the entire exterior surface area of the spindle forging. In this case, the total exterior surface area of the forging was approximately 874 square inches. The electrolyte solution was air-agitated and maintained at a temperature of 90° F. during practice of the invention. Decarburized metal was removed at a rate of approximately 0.0001" per minute; all such metal was removed from the part by continuing the electrical current flow at the above-detailed density over a period of approximately 7 hours. Metal was therefore removed from the spindle part to a uniform total depth of approximately 0.040". During the process approximately 14 kilowatt-hours of electrical energy were required to remove each pound of decarburized metal from surface regions of the component part. Subsequent inspection and evaluation of the completed spindle established that the finished part was completely free of decarburized metal, had improved fatigue properties, and developed the maximum permissible allowable design stress throughout its entire cross-sectional area. In addition, the completed component part had a surface smoothness of approximately 45 to 60 microinches (R.M.S.) and was completely free of any condition which would give rise to the existence of a stress riser. The part displayed no evidence of hydrogen embrittlement.

The process of this invention has also been utilized to remove decarburized metal from the surface regions of a component part which serves as a landing gear downlock fitting for aircraft. Such fitting was hot-forged of a heat-treatable alloy steel having the composition of previously-described Steel "C" and weighed approximately 15 pounds. The apparatus generally described with respect to FIGS. 6 through 12 was employed in connection with the removal of decarburized metal from this part. Also, the apparatus arrangement, electrolyte solution, and agitation and temperature controls employed in connection with the above-discussed aircraft stabilizer spindle manufacture were employed with the landing gear downlock fitting except for the contour of overlay members 148 and 149 and except that the electrical energy source was operated at a potential of approximately 9.0 volts D.C. Electrical connections were maintained between the workpiece and the electrical energy source at times just prior to and after insertion and removal of the part relative to the electrolyte solution. When the part was immersed in the electrolyte, a current density of approximately 9.8 amperes per square inch was provided throughout the 153 square inch exterior surface area of the part. Decarburized metal was removed at a rate of approximately 0.00033" per minute and was continued for a period of approximately 2 hours to remove surface material to a uniform nominal depth of approximately 0.040". During such metal removal operation, approximately 17 kilowatt-hours of electrical energy were required to remove each pound of decarburized metal. The completed downlock fitting corresponded to the previously-described vertical spindle insofar as qualities and characteristics are concerned.

Additional information regarding this invention is provided as follows. In general, hydrogen embrittlement adversely affects those alloy steels which have tensile strengths of approximately 180,000 p.s.i. and above. Care must be taken to either avoid processing of alloy steel component parts under conditions such as acid etching, electro-plating, and the like or to subsequently remove absorbed hydrogen from the component part by heating the part at an elevated temperature over a sufficient period of time. With use of the instant invention, decarburized metal may be removed from the alloy steel component part in a manner which completely avoids hydrogen embrittlement and no subsequent baking or heating of the part for the purpose of removing absorbed hydrogen is required. By using this invention, the toxic and corrosive fume condition associated with acid etching of decarburized metal is completely avoided.

Decarburized metal generally exists in surface regions of heat-treatable alloy steel component parts whenever such component part has been heated or worked at temperatures of approximately 1300° F. and above and in an oxidizing atmosphere. Such decarburized metal is developed at the surface of the component part to a depth which varies with temperature and time. In the case of hot-forged component parts, the alloy steel includes decarburized metal which is generally to a greater depth than in the case of component parts which are only normalized or heat-treated.

I claim:

1. In a method of fabricating a configured component part, the steps of: working a billet of heat-treatable alloy steel having at least 0.3% carbon at an elevated temperature and in an oxidizing atmosphere to form a workpiece having a configuration similar to the configuration of said component part and having a generally-exterior layer comprised of decarburized alloy steel in excess of 0.003 inch in depth, suspending said workpiece as an anode in an electrolyte solution which consists of from 20% to 30% sulphuric acid by weight and water, flowing electrical current to said workpiece uniformly throughout the extent of said generally-exterior decarburized alloy steel layer at a current density which is in the approximate range of 3 amperes per square inch to 10 amperes per square inch, and withdrawing said workpiece from said electrolyte solution after said electrical current has been flowed a sufficient time to completely remove said generally-exterior decarburized alloy steel layer and thereby form said configured component part.

2. In a method of fabricating a configured component part, the steps of: working a billet of heat-treatable alloy steel having at least 0.3% carbon at an elevated temperature and in an oxidizing atmosphere to form a workpiece having a generally-exterior layer comprised of decarburized alloy steel and having a layer of oxide scale superimposed on said decarburized alloy steel layer, removing said oxide scale layer from said workpiece, suspending said workpiece as an anode in an essentially single-acid electrolyte solution which consists of from 20% to 30% sulphuric acid by weight, flowing electrical current to said workpiece uniformly throughout the extent of said decarburized alloy steel layer at a current density which is in excess of approximately 3 amperes per square inch and at a potential which is less than approximately 8 volts, and withdrawing said workpiece from said electrolyte solution after said electrical current has been flowed a sufficient time to completely remove said generally exterior decarburized alloy steel layer and thereby form said configured component part.

3. In a method of fabricating a configured component part, the steps of: working a billet of heat-treatable alloy steel having at least 0.3% carbon to form a workpiece having a surface area configured similarly to a portion of said configured component part, suspending said workpiece as an anode in an essentially single-acid electrolyte solution which consists of from 20% to 30% sulphuric acid by weight, flowing electrical current to said workpiece at a current density which is in the range of approximately 3 amperes per square inch to 10 amperes per square inch and at a potential which is in the range of approximately 5 volts to 8 volts for a period of time which is at least approximately one hour to thereby form said configured component part.

4. In a method of fabricating a configured component part from a similarly-configured workpiece of heat-treatable alloy steel having at least 0.3% carbon, the step of: anodically immersing said workpiece in a single-acid electrolyte consisted of water and from 20% to 30% sulphuric acid by weight at a current density of approximately 3 amperes per square inch to 10 amperes per square inch and at a potential in the range of approximately 5 volts to 8 volts for at least one hour to thereby provide said workpiece with improved fatigue strength and fatigue life properties without exposure to hydrogen embrittlement or intergranular corrosion.

References Cited by the Examiner
UNITED STATES PATENTS

| | | | |
|---|---|---|---|
| 1,916,503 | 7/33 | Wilson | 204—145 |
| 2,115,005 | 4/38 | Blaut | 204—145 |
| 2,412,058 | 12/46 | Pfeil | 204—141 |
| 2,861,930 | 11/58 | Robinson | 204—104.5 |
| 2,876,132 | 3/59 | Worden et al. | 204—145 |
| 2,888,391 | 5/59 | Loughman | 204—143 |
| 3,066,084 | 11/62 | Osterman et al. | 204—145 |

WINSTON A. DOUGLAS, *Primary Examiner.*

JOHN H. MACK, JOHN R. SPECK, MURRAY TILLMAN, *Examiners.*